Patented Oct. 26, 1937

2,096,721

UNITED STATES PATENT OFFICE 2,096,721

ORGANIC MERCURY COMPOUNDS

Carl N. Andersen, Watertown, Mass., assignor to Lever Brothers Company, a corporation of Maine No Drawing. Application January 21, 1935, Serial No. 2,759

13 Claims. (Cl. 260—13)

The present invention relates to the production of certain new organic mercury compounds.

It is an object of my invention to produce new organic mercury compounds useful as germicides and for other therapeutic purposes.

More particularly, it is an object of my invention to prepare certain organic mercury compounds which may be regarded as derivatives of dyes.

I have discovered that when the essential radical of certain aromatic mercury compounds is introduced in dyes, compounds are produced which have extraordinarily high potency as antiseptics and germicides and at the same time are characterized by relatively low toxicity and other desirable properties.

The compounds constituting the subject-matter of my invention may be described as having the general formula $(RHg)_x \cdot R_1$, in which R represents an aromatic structure, to a carbon atom of which the mercury is directly attached; in which $x$ is an integer representing the number of aromatic mercury groups in the compound, which integer is at least one and not more than the number of replaceable hydrogen atoms in the radical $R_1$; and in which $R_1$ represents a radical of a dye to which is linked the RHg group. While the words "group" or "groups" are used hereinafter, it is obvious that these words are to be understood as singular or plural depending on the value of $x$.

More particularly, R represents an aromatic structure which may be an aromatic nucleus with or without side chains, and the expression "aromatic structure" used herein is intended to be generic and includes an aromatic nucleus with or without side chains. The aromatic structure is of the type in which none of the nuclear or side chain carbon atoms had direct linkage with any element other than hydrogen, carbon, or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

The dyes from which aromatic mercury derivatives may be prepared are of various chemical structures, colors and dyeing properties. I have investigated dyes of many chemical structures, such as the azo (mono and poly) type, xanthine type, pyrazolone type, azine type, anthraquinone type, thiazole type, stilbene type, quinoline type, oxazine type, triphenyl methane type, anthraquinoid type, etc., all of which I find may be used to produce aromatic mercury derivatives possessing germicidal properties. By the term "dye" I refer to a chemical compound containing one or more of the "chromophore" groups, and therefore to a compound possessing a characteristic color.

The chemical structure of dyes is very complex and the exact chemical mechanism of the reactions into which they enter is very difficult to determine. In many instances I have not determined the exact position in the dye molecule at which the aromatic mercury group enters, or the formula of the resulting compound. In the following paragraphs I have outlined some general principles which should assist in determining the formulæ of my novel compounds. However, having disclosed the method by which my new compounds may be produced so as to enable a person skilled in the art to practice my invention, I do not feel obliged to assign a definite chemical formula to every compound within the scope of my invention.

Many dyes possess certain groups which contain a replaceable hydrogen atom. For example, the sulphonic group —$SO_3H$, the carboxyl group —COOH, the hydroxyl group —OH, the sulfonamido group —$SO_2NH_2$, and the —NH group. From my investigations I am inclined to believe that when a dye contains one or more of any of these groups it is the hydrogen atom or atoms thereof that are replaced by the aromatic mercury radical.

In cases in which more than one of the different groups occur in one dye, it is difficult to tell in which group the hydrogen has been replaced by the aromatic mercury radical. Certain general rules should apply. There are exceptions to these rules due to the effect of steric hindrance, and the effect of other groups in the molecule. However, it is a convenient guide to classification.

The sulfonic acid group is the most acidic and when present in a dye it will usually be the group to react with the aromatic mercury compound. When the dye does not contain a sulfonic group, the carboxyl group is the next most acidic and will be the group to react. If a dye contains neither the sulfonic nor the carboxyl groups, the phenolic hydroxyl is the most reactive. The alcoholic hydroxyl is slightly less reactive than the phenolic. The NH group is usually the least reactive and only reacts when all of the other above mentioned more active groups are absent or do not exist in the free state. The rule regarding the dyes containing the NH group holds true with less regularity, however, as I find some instances where the NH group is quite reactive. This is particularly true of dyes in which the reactivity of the NH group varies greatly due to the surrounding groups. The difference in reactivity between the OH and NH groups is not as pronounced as is the case with the other groups, for example, the carboxyl and the hydroxyl.

When it is desired to replace a particular hydrogen atom by the aromatic mercury radical, it is often necessary to block the substitution in the more reactive groups. For example, when a dye contains both the carboxyl and the sulfonic groups and both are free acids, the aromatic mercury radical will react with sulfonic group as explained above. If sufficient alkali is added to convert the sulfonic group to an alkali sulfonate leaving the carboxyl group free, then the aromatic mercury radical will react with the carboxyl group. Similarly, when only the carboxyl and hydroxyl groups are free, the aromatic mercury radical reacts with the carboxyl group. If the carboxyl group is converted to a salt, the aromatic mercury radical will react with the hydroxyl group. The same system of blocking may be employed in the case of dyes containing other combinations of the above mentioned radicals.

In many cases the dyes are sold as salts, in which case the hydrogen of one or more groups has been replaced by an alkali metal. When the dye-stuff is available only in this form, and it is desired to introduce the aromatic mercury radical into one of these groups, the free acid should be liberated by treatment with a mineral acid before being reacted with the aromatic mercury compound.

If the dye is not so treated the substitution will no doubt take place in the most reactive group containing a free hydrogen. For example, if a dye contains the SO₃Na, COONa, OH and NH groups, the substitution will be in either the OH or NH groups, depending upon which is the more reactive in that particular compound.

This permits more than one aromatic mercury compound to be prepared from a single dye. For example, if a dye contains the SO₃Na, the COONa, and the OH groups, it would be possible to form three compounds, depending on the position in the dye molecule at which the aromatic mercury radical is introduced.

The hydrogen atom of more than one of similar or different groups may be replaced if desired. For example, if the dye contains two SO₃H groups or an SO₃H group and a COOH group, the hydrogen of both groups may be replaced if a sufficient quantity of the aromatic mercury compound is employed in the process.

From the above explanation it will be apparent that when the dye contains a free —SO₃H group, either naturally or by treatment of an alkali sulfonate with an acid, the aromatic mercury radical will be attached to this group even though the dye contains one or more of any of the following radicals: COONa, COOH, ONa, OH and NH.

Many dyes I have investigated do not possess a group which contains a replaceable hydrogen atom. When such a dye is employed in the reaction with an aromatic mercury compound, I am unable to state the position of the aromatic mercury radical in the dye molecule or the formula of the resulting compound. It is quite probable that it forms an addition compound of some type in which the aromatic mercury radical becomes attached directly to some element, for example, a hetero-atom, perhaps through a change in the valence of the element. If the dye does not contain a replaceable hydrogen atom it may be because it does not contain any of the above-mentioned groups or because the hydrogen atoms in these groups have been replaced by an alkali metal.

I have prepared aromatic mercury derivatives of the following dyes, all of which I find to possess germicidal properties. These dyes are illustrative of the various general types heretofore described and indicate the broad scope of the structure of the aromatic mercury dye compounds comprising my invention.

*Class I.—Sulfonic acid dyes*

The dyes in this class contain the SO₃H group or salt corresponding to this group. These dyes may also contain one or more of the COOH, OH or NH groups.

Chrome Fast Yellow (azo type), "Schultz", 7th ed #432, "Colour Index" #441.

Diamond Red (azo type), "Schultz" #253, "Colour Index" #216.

Chrome Yellow D (azo type), "Schultz" #230, "Colour Index" #195.

Anthracene Red (azo type), "Schultz" #429, "Colour Index" #431.

Benzo Orange R (azo type), "Schultz" #404, "Colour Index" #415.

Chromoxane Cyanine RA Ext. (triphenyl methane type), "Schultz" #840.

Benzo Fast Orange WSD (azo type), "Schultz" #305.

Benzo Fast Red (azo type), "Schultz" #566, "Colour Index" #278.

Fast Acid Violet B (xanthine type), "Schultz" #873, "Colour Index" #757.

Diamine Green CA (azo type), "Schultz" #668, "Colour Index" #593.

Tartrazine (pyrazolone type), "Schultz" #737, "Colour Index" #640.

Wool Fast Blue GLA (azine type), "Schultz" #974, "Colour Index" #833.

Alizarine Cyanine Green G (anthraquinone type), "Schultz" #1201, "Colour Index" #1078.

Primuline (thiazole type), "Schultz" #932, "Colour Index" #812.

Fastusol Yellow (thiazole type), "Schultz" #935, "Colour Index" #814.

Chrysophenine (stilbene type), "Schultz" #726, "Colour Index" #365.

Quinoline Yellow (quinoline type), "Schultz" #918, "Colour Index" #801.

Quinoline Yellow has the following formula:

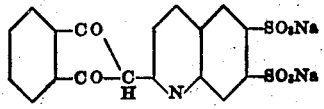

*Class II.—Carboxylic acid dyes*

The dyes in this class contain the COOH group or salt corresponding thereto. They may contain one or more of the OH or NH groups. Many of the dyes in this group also contain the sulfonic group, but they will not be repeated here since the more acidic sulfonic group will usually be the first one to react with the aromatic mercury radical.

Fastusol Yellow GGA (azo type), "Schultz" #341, "Colour Index" #346.

Chrysamine L (azo type), "Schultz" #419, "Colour Index" #410.
Alizarine Yellow (azo type), "Schultz" #66, "Colour Index" #40.
Diamine Yellow N (azo type), "Schultz" #525, "Colour Index #488.
Eosine Y (xanthine type), "Schultz" #881, "Colour Index" #768.
Phloxine RB (xanthine type), "Schultz" #888, "Colour Index" #774.
Uranine SS (xanthine type), "Colour Index" #776. "Schultz" #880,
Gallocyanine (oxazine type), "Schultz" #998, "Colour Index" #883.
Rhodamine B (xanthine type), "Schultz" #864, "Colour Index" #749.

Class III.—Alcoholic or phenolic dyes

The dyes in this class contain the OH group. They may in addition contain the NH group. Many of the dyes in this group contain one or both of the SO3H or COOH groups, but they will not be repeated here since these groups, being the more acidic, will usually be the first ones to react with the aromatic mercury radical.
Modern Violet N (heterocyclic type), "Schultz" #996, "Colour Index" #881.
Rosolic Acid (triphenyl methane type), "Schultz" #843, "Colour Index" #724.
Alizarine (anthraquinoid type), "Schultz" # 1141, "Colour Index" #1027.
Sudan I (azo type), "Schultz" #33, "Colour Index" #24.
Dianisidin Base (azo type), "Schultz" #490, "Colour Index" #499 and #500.
Fast Red B Base (azo type), "Schultz" #155, "Colour Index" #117.

Class IV.—Imide dyes

The dyes in this class contain the NH group. Many of these dyes contain one or more of the SO3H, COOH or OH groups, but they will not be repeated here since these groups, being the more reactive, will usually be the first ones to react with the aromatic mercury radical.
Indigo (heterocyclic type), "Schultz" #1301, "Colour Index" #1177.
Auramine (triphenyl methane type), "Schultz" #752, "Colour Index" #655.
Algol Yellow (anthraquinone type), "Schultz" #1250, "Colour Index" #1138.
Indanthrene Blue GCDA (azine type), "Schultz" #1234, "Colour Index" #1113.
Aniline Black (phenimide type), "Schultz" #1361, "Colour Index" #870.
Indanthrene Red Violet RRN (anthraquinone type), "Schultz" #1260, "Colour Index" #1161.

Class V.—Sulfonamide dyes

The dyes in this class contain at least one sulfonamide group—SO2NH2:
Sacchareine chlorhydrate, "Schultz" #859, "Colour Index #744.

Class VI.—Miscellaneous dyes

The following dyes do not contain any of the above mentioned groups and for that reason do not contain a replaceable hydrogen atom:
Rheonine AL (acridine type), "Schultz" #911, "Colour Index" #795.
Neutral Acriflavine (acridine type), "Schultz" #906, "Colour Index" #790.
The following dyes, while containing one of the above mentioned groups, do not contain a replaceable hydrogen atom because it has been replaced by an alkali metal:
Primuline (thiazole type), "Schultz" #932, "Colour Index" #812.
Fastusol Yellow LRRD (thiazole type), "Schultz" #935, "Colour Index" #814.
Uranine SS (xanthine type), "Schultz" #880, "Colour Index" #776.
Chrysophenine (stilbene type), "Schultz" #726, "Colour Index" #365.

The general method of preparing my novel compounds consists in reacting the dye with an aromatic mercury compound of the above mentioned RHg type. Any common solvent in which the reacting components are soluble may be used. The compound resulting from the reaction is often relatively insoluble as compared with the reacting components and upon its precipitation may be filtered, washed and dried. If the compound formed is too soluble to precipitate, the solution may be concentrated and the new compound will crystallize out. For reasons of convenience, one of the more soluble aromatic mercury compounds is selected as a reacting material, such as the hydroxide or a soluble salt, for example, the acetate or the lactate. The hydroxide has the advantage that in most instances water is the only other compound formed, if any, and the resultant product may be more easily purified.

The following examples are given as illustrative of the method by which all of the dye compounds of the present invention may be prepared and the products prepared are illustrative of representative aromatic mercury dye derivatives falling within the scope of my invention:

Example 1

17.64 grams of phenylmercury hydroxide is dissolved in 4 liters of water and heated until solution is complete. The solution is filtered to remove any insoluble material. 7.56 grams of Benzo Fast Orange WSD ("Schultz" #305), is dissolved or suspended in 500 cc. of alcohol and added to the filtered phenylmercury hydroxide. The mixture is boiled for a few minutes and allowed to cool. A red crystalline mass separates and after standing for a few hours the mixture is filtered and the precipitate washed well with warm water and a few cc. of alcohol and dried.

This dye contains two free sulfonic acid groups and the hydrogen thereof is believed to be replaced by the phenylmercury radical. In the above example the mono compound is formed. If the di compound is desired double the quantity of phenylmercury hydroxide is used. Benzo Fast Orange WSD has the formula:

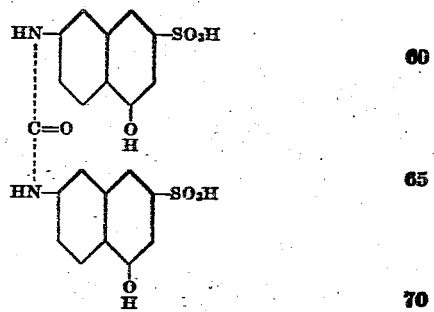

Example 2

17.64 grams of phenylmercury hydroxide is dissolved in 2 liters of water and heated until solution is complete. The solution is filtered to remove any insoluble material. To the filtrate is added 28.56 grams of Diamond Red ("Schultz" #253, "Colour Index" #216), dissolved or suspended in water. The mixture is heated for a few minutes to insure complete reaction and then allowed to stand and cool. Reddish crystals separate, which are separated by filtration, washed with warm water and dried.

This dye contains the SO₃Na group, COONa and OH groups. Due to this replacement of the hydrogen atoms by an alkali metal, the hydrogen of the hydroxyl group is believed to be replaced by the phenyl mercury radical.

*Example 3*

40.32 grams of phenylmercury acetate is dissolved in 4 liters of water and heated until solution is complete. The solution is filtered to remove any insoluble material. 32.16 grams of Chromoxane Cyanine RA Ext. ("Schultz" #840), is dissolved in 500 cc. of water and treated with 2.2 grams of 100% sulphuric acid. To this solution is added the filtered phenylmercury acetate solution. A light reddish precipitate results and the mixture is allowed to cool for some time, after which it is filtered by suction and the precipitate washed well with warm water and dried.

This dye contains the SO₃Na, COONa and OH groups. The treatment with sulphuric acid replaces sodium in the sulphonate group with hydrogen which is believed to be replaced by the phenylmercury radical. Chromoxane Cyanine RA Ext. has the following formula:

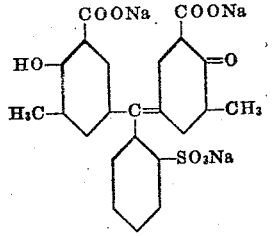

*Example 4*

20.16 grams of phenylmercury acetate is dissolved in one liter of water and heated until solution is complete. The solution is filtered to remove any insoluble material. To the filtrate is added 14.1 grams of Chrysamine L ("Schultz" #419, "Colour Index" #410), suspended in a small quantity of water. The mixture is heated to boiling for a few minutes and set aside to cool. A fine yellow crystalline mass separates, which is removed by filtration, washed well and dried.

This dye contains the COONa and OH groups, and it is believed that the hydrogen of the hydroxyl group is replaced by the phenylmercury radical.

*Example 5*

20.16 grams of phenylmercury acetate is dissolved in 2 liters of water and heated until solution is complete. The solution is filtered to remove any insoluble material. To the filtrate is added 24.6 grams of Rhodamine B ("Schultz" #864, "Colour Index" #749), dissolved in 400 cc. of water. A precipitate results immediately. The mixture is heated for a few minutes and then allowed to stand and cool, after which it is filtered and the precipitate washed well with warm water and dried.

This dye contains one free carboxyl group, the hydrogen of which is believed to be replaced by the phenylmercury radical.

*Example 6*

17.64 grams of phenylmercury hydroxide is dissolved in 1 liter of alcohol and heated until solution is complete. To this solution is added 14.88 grams of Sudan I ("Schultz" #33, "Colour Index" #24), dissolved in 200 cc. of alcohol. The mixture is heated for a few minutes and filtered, after which it is allowed to cool. Bright red, well defined, and glistening crystals separate, which are removed by filtration, washed well and dried.

This dye contains only one hydroxyl group, the hydrogen of which is believed to be replaced by the phenylmercury radical.

*Example 7*

17.64 grams of phenylmercury hydroxide is dissolved in 4 liters of water and heated until solution is complete. The mixture is filtered to remove any insoluble material. To the filtrate is added 16.02 grams of auramine ("Schultz" #752, "Colour Index" #655), in solid form. The mixture is agitated thoroughly and the solid material soon dissolves. The mixture is heated for a few minutes and set aside to cool. Distinct yellow crystals separate, which are separated by filtration, washed well and dried.

This dye contains only one imido group, the hydrogen of which is believed to be replaced by the phenylmercury radical.

*Example 8*

35.28 grams of phenylmercury hydroxide is dissolved in 2 liters of water and heated until solution is complete. The solution is filtered to remove any insoluble material. To the filtrate is added 33 grams of Fastusol Yellow LRRD ("Schultz" #935, "Colour Index" #814), dissolved or suspended in 500 cc. of alcohol. Upon heating the mixture for a few minutes complete solution results, and on cooling a yellow precipitate separates on the sides of the container. After standing for some time the precipitate is separated by filtration, washed well with warm water and dried.

This dye contains one SO₃Na group, and since the dye has not been treated with an acid to form a sulfonic acid group, I am unable to state what may be the structure of the product produced.

In each of the above examples the reacting materials are employed in substantially theoretical quantities. In certain instances, if desired, an excess say 10% of the dye may be employed in order to assure the complete conversion of the aromatic mercury compound.

From the description of these specific examples it will be readily apparent to one skilled in the art how other dyes of the type above described may be reacted with an aromatic mercury compound to produce aromatic mercury dye derivatives.

The operativeness of the process is not found to depend in any degree upon the temperature at which the reaction is effected. It is convenient to use heat because it facilitates the solution of the reacting components and in some cases speeds the reaction, but the process can be carried out at any temperature, for example, room temperature. The process may be carried out in any solvent, in which both reacting components are soluble. Water is usually employed for reasons of convenience, but any other material which does not enter into the reaction and in which the materials are soluble, may be used, for example one of the alcohols, acetone, or mixtures of these with each other or with water.

All of the compounds produced as above described are characterized by extraordinarily high potency as germicides. Tests to determine the efficacy of certain of them in killing *B. typhosus* and *Staph. aureus* were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against *Eberthella typhi* (typhoid bacillus) at 37° C. and F. D. A. special method against *Staph. aureus* at 37° C.

As illustrative of the potency of the compounds, the killing power of the following compounds is given merely as illustrative:

The figures represent the maximum dilutions at which killing in 15 minutes resulted:

|  | B. typhosus | Staph. aureus |
|---|---|---|
| Phenylmercury derivative of Benzo Fast Orange | 1:40,000 | 1:50,000 |
| Phenylmercury derivative of Chromoxane Cyanine RA | 1:100,000 | 1:60,000 |
| Phenylmercury derivative of Chrysamine L | 1:100,000 | 1:62,500 |
| Phenylmercury derivative of Rhodamine B | 1:60,000 | 1:30,000 |
| Phenylmercury derivative of Saccharine Chlorhydrate | 1:57,000 | 1:38,000 |

In addition to their high germicidal value, all of these compounds are characterized by relatively low toxicity. Because of these properties it is possible to use them in extreme dilutions and in many situations where known germicides, because of toxic or other undesired properties, can not be employed. They may be used externally and locally with satisfactory results from the germicidal standpoint and without harmful effect to the body or its functions.

The compounds retain their germicidal activity when incorporated in soap and various menstruums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. A new organic mercury compound of the general formula $(RHg)_x \cdot R_1$, in which R represents an aromatic structure to a carbon atom of which the mercury is directly attached and in which none of the carbon atoms has direct linkage with any element other than hydrogen, carbon and mercury; in which $R_1$ represents the radical of a dye having at least one hydrogen containing group the hydrogen in which is replaceable by the RHg group, said replaceable hydrogen being other than hydrogen attached to carbon, and said radical $R_1$ being linked to the RHg group by the replacement of said replaceable hydrogen; and in which $x$ represents the number of RHg groups in the compound and is an integer having a value of at least one and not more than the number of said replaceable hydrogens in said hydrogen containing groups in said dye.

2. A new organic mercury compound of the general formula $(RHg)_x \cdot R_1$, in which R represents an aromatic structure to a carbon atom of which the mercury is directly attached, and in which none of the carbon atoms has direct linkage with any element other than hydrogen, carbon and mercury; in which $R_1$ represents a radical of a dye containing a sulfonic group, which radical is linked to the RHg group by the replacement of the hydrogen atom of the sulfonic group and in which $x$ is an integer representing the number of RHg groups in the compound, which integer is at least one and not more than the number of sulfonic groups in the radical $R_1$.

3. A new organic mercury compound of the general formula $(RHg)_x \cdot R_1$, in which R represents an aromatic structure to a carbon atom of which the mercury is directly attached, and in which none of the carbon atoms has direct linkage with any element other than hydrogen, carbon and mercury; in which $R_1$ represents a radical of a dye containing a sulfonic group and one or more of any of the carboxyl, hydroxyl and NH groups, which radical is linked to the RHg group by the replacement of the hydrogen atom of the sulfonic group and in which $x$ is an integer representing the number of RHg groups in the compound, which integer is at least one and not more than the number of sulfonic groups in the radical $R_1$.

4. A new organic mercury compound of the general formula $(RHg)_x \cdot R_1$, in which R represents an aromatic structure to a carbon atom of which the mercury is directly attached, and in which none of the carbon atoms has direct linkage with any element other than hydrogen, carbon and mercury, in which $R_1$ represents a radical of a dye containing the sulfonic, hydroxyl and NH groups, which radical is linked to the RHg group by the replacement of the hydrogen atom of the sulfonic group and in which $x$ is an integer representing the number of RHg groups in the compound, which integer is at least one and not more than the number of sulfonic groups in the radical $R_1$.

5. A new organic mercury compound of the general formula $(RHg)_x \cdot R_1$, in which R represents an aromatic structure to a carbon atom of which the mercury is directly attached, and in which none of the carbon atoms has direct linkage with any element other than hydrogen, carbon and mercury; in which $R_1$ represents a radical of a dye containing the sulfonic, carboxyl and hydroxyl groups, which radical is linked to the RHg group by the replacement of the hydrogen atom of the sulfonic group and in which $x$ is an integer representing the number of RHg groups in the compound, which integer is at least one and not more than the number of sulfonic groups in the radical $R_1$.

6. A new organic compound of the general formula $(C_6H_5Hg)_x \cdot R_1$, in which $R_1$ represents the radical of a dye having at least one hydrogen containing group the hydrogen in which is replaceable by the $C_6H_5Hg$ group, said replaceable hydrogen being other than hydrogen attached to carbon, and said radical $R_1$ being linked to the $C_6H_5Hg$ group by the replacement of said replaceable hydrogen; and in which $x$ represents the number of $C_6H_5Hg$ groups in the compound and is an integer having a value of at least one and not more than the number of said replaceable hydrogens in said hydrogen containing groups in said dye.

7. A new organic compound of the general formula $(C_6H_5Hg)_x \cdot R_1$, in which $R_1$ represents a radical of a dye containing a sulfonic group, which radical is linked to the $C_6H_5Hg$ group by the replacement of the hydrogen atom of the sulfonic group and in which $x$ is an integer representing the number of $C_6H_5Hg$ groups in the compound, which integer is at least one and not more than the number of sulfonic groups in the radical $R_1$.

8. A new organic compound of the general formula $(C_6H_5Hg)_x \cdot R_1$, in which $R_1$ represents a radical of a dye containing a sulfonic group and one or more of any of the carboxyl, hydroxyl and NH groups, which radical is linked to the $C_6H_5Hg$ group by the replacement of the hydrogen atom of the sulfonic group and in which $x$ is an integer representing the number of $C_6H_5Hg$ groups in the compound, which integer is at least one and not more than the number of sulfonic groups in the radical $R_1$.

9. A new organic compound of the general formula $(C_6H_5Hg)_x \cdot R_1$, in which $R_1$ represents a radical of a dye containing the sulfonic, hydroxyl and NH groups, which radical is linked to the $C_6H_5Hg$ group by the replacement of the hydrogen atom of the sulfonic group and in which $x$ is an integer representing the number of $C_6H_5Hg$ groups in the compound, which integer is at least one and not more than the number of sulfonic groups in the radical $R_1$.

10. A new organic compound of the general formula $(C_6H_5Hg)_x \cdot R_1$, in which $R_1$ represents a radical of a dye containing the sulfonic, carboxyl and hydroxyl groups, which radical is linked to the $C_6H_5Hg$ group by the replacement of the hydrogen atom of the sulfonic group and in which $x$ is an integer representing the number of $C_6H_5Hg$ groups in the compound, which integer is at least one and not more than the number of sulfonic groups in the radical $R_1$.

11. A phenylmercury sulfonate of the dye Benzo Fast Orange WSD, said dye having the formula:

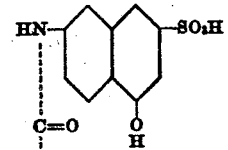

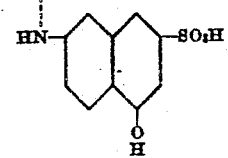

12. Phenylmercury sulfonate of the dye Chromoxane Cyanine RA Ext., said dye having the formula:

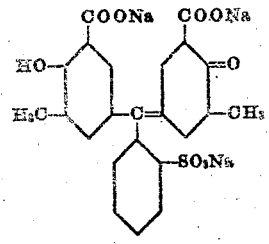

13. A phenylmercury sulfonate of the dye Quinoline Yellow, said dye having the formula:

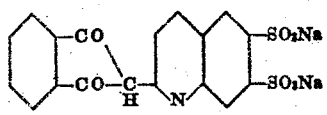

CARL N. ANDERSEN.